Patented Nov. 17, 1931

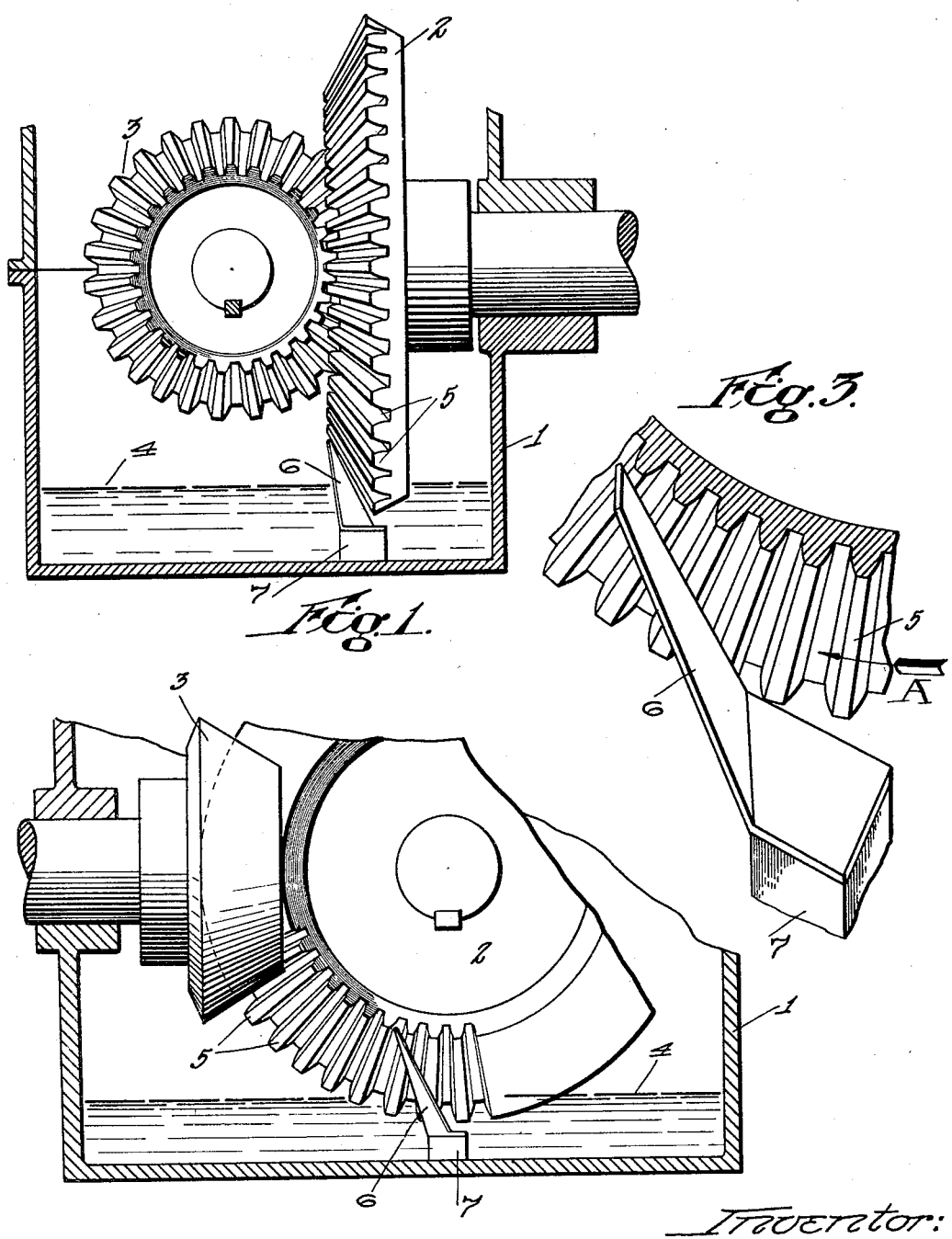

1,832,099

UNITED STATES PATENT OFFICE

FRANK P. DAHLSTROM, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

LUBRICATION OF GEARS AND THE LIKE

Application filed March 20, 1929. Serial No. 348,502.

The present invention relates in general to the lubrication of gears, or similar rotary elements.

It is customary, in the case of a vertically disposed gear, to secure its lubrication by partial submergence of the same in a liquid or semi-liquid lubricant contained in the gear box or casing. If the lubricant appreciably submerges such a gear, excessive churning is almost certain to occur, which raises the temperature of the lubricant and reduces correspondingly its lubricating properties. Not only that, but the lubricant acts as a very powerful brake on the rotating gear and very materially reduces the power which is to be transmitted thereby, and also the speed at which the gear can run.

In the operation of large high speed gears, to avoid the churning of and braking by the lubricant, it is the custom to keep the lubricant level so low in the gear case that only a very slight submergence of the gear's periphery is obtained. This slight submergence serves the purpose very well with ordinary spur gears, because the teeth of such gears, lying wholly on the outside rim, or portion of greatest circumference, are successively carried almost completely below the lubricant level, even with a very slight peripheral submergence of the gear body. With bevel gearing however, a different situation exists. The teeth of a bevel gear are cut on the face rather than on the periphery of the disk, and they extend radially inward toward the center for an appreciable distance, so that when the customary slight peripheral submergence is arranged for, only the outer tips of the bevel gear teeth will dip below the level of the lubricant.

In other words, the same slight peripheral submergence (limited so as to avoid churning and braking effects) that puts a film of lubricant over the entire tooth surfaces of spur gears, cannot possibly serve to adequately lubricate the entire surfaces of bevel gear teeth; because such bevel tooth surfaces, for the major portions of their areas, inwardly of the extreme outer tips of the teeth, would be practically untouched by the lubricant.

According to this invention, the above mentioned difficulties in the lubrication of bevel gears and the like are overcome, in the absence of any deeper submergence of the gear teeth in the lubricant, by the provision of a device which utilizes the motion of the teeth themselves to secure the spreading of the lubricant over the entire unsubmerged portion of each tooth. Other and further objects and advantages of the invention will be apparent from the following detailed description thereof, taken in connection with the accompanying illustrative drawings in which—

Fig. 1 is an elevational view, partly in section, showing my invention applied to the lubrication of bevel gears.

Fig. 2 shows the same parts, as viewed from a plane at right angles to that of Fig. 1.

Fig. 3 is a fragmentary isometric view on a larger scale, illustrating the action of the device.

Like reference characters refer to like parts in the different figures.

In said drawings, the numeral 1 indicates the usual gear box or casing for a pair of intermeshing bevel gears 2 and 3, one of which (in this case the gear 2) runs with its lowest point submerged below the level 4 of liquid lubricant contained in the casing 1. As shown, the teeth 5 of gear 2 as they successively reach the lowest position, only dip their extreme outer portions below the lubricant level 4, thus avoiding such a submergence of the gear body as would cause undue churning of the lubricant and a braking effect on the gear. That is to say, any appreciable raising of the lubricant level 4, by the introduction of more lubricant to the casing 1, would produce objectionable churning and braking effects in the operation of the gear 2; on the other hand, it is evident that, under the conditions illustrated, there would ordinarily be no adequate lubrication of the inner unsubmerged portions of the gear teeth 5, or of the corresponding tooth portions of the intermeshing gear 3, since only the outer tips of the teeth 5 dip below the lubricant level 4.

This situation is corrected by the device of my invention, which comprises a stationary partially-submerged member or blade 6, having a suitable mounting, as shown at 7, in the zone of submergence of the gear teeth 5. Said member or blade 6 is inclined from the vertical in the direction of travel of the teeth (shown by arrow A) and its surface, so inclined, lies in a plane which makes an acute angle with the surface traced by the faces of teeth 5. The inner edge 8 of blade 6, adjacent said teeth, conforms substantially to said gear surface, without actually touching same, and thus the blade surface and the gear surface cooperate to form a sloping wedge-shaped trough, the upper portion of which is above the lubricant level 4.

The action of the stationary blade 6, arranged as above described, upon the heavy lubricating material set in motion by the rotating gear 2, may be compared to that of a plow, similarly arranged and moving through the material from left to right in Fig. 2. Just as such a plow would deflect the material, cumulatively, toward its outer end, so the blade 6, standing as an obstruction to the lubricant set in motion by the sweep of the successive gear teeth 5 therethrough, causes said lubricant to climb upwardly, well above the level 4, in the inclined trough which is formed with the gear face. Thus, the unsubmerged or inner portions of the teeth 5, as they sweep past the blade 6, will acquire an adequate coating of lubricant, by their contact with the constantly maintained supply of lubricant in the unsubmerged portion of said trough. In other words, notwithstanding the fact that the lubricant level 4 is kept so low that it is reached only by the extreme outer tips of the teeth 5, my invention secures, in the absence of undue lubricant churnings, or braking effect on the gear, an elevation and spreading of the lubricant onto the inner unsubmerged portions of the gear teeth 5 as they sweep past the member 6.

From the foregoing, it is apparent that the present invention provides an extremely effective means for spreading the lubricant over the entire face of a rotating gear, the device functioning invariably to bring about this result, without requiring any deeper submergence of the teeth. The device is characterized by its extreme simplicity and the fact that when once installed it will operate continuously, without requiring any adjustments; and since there are no parts subject to wear, the device is adapted to successfully perform its function indefinitely.

I claim:

1. The combination, with a rotating element providing an annular face whose lower portion has limited submergence in liquid lubricant, of a cooperating stationary member for spreading the lubricant set in motion by said rotating element over the unsubmerged portions of the latter's annular face.

2. The combination, with a rotating member providing an annular face whose portion furthest removed from the axis of rotation has limited submergence in liquid lubricant, of a stationary member disposed in the zone of submergence of said rotating element for deflecting upwardly the lubricant set in motion by said rotating element, thereby to lubricate the unsubmerged portions of the annular face nearer to the axis of said rotating element.

3. The combination, with a gear having tooth faces radiating from its axis, whose rotation sweeps the outer portions only of its tooth faces through a liquid lubricant supply, of a stationary member cooperating with said gear to obtain the elevation of lubricant to the other, inner portions of said tooth faces.

4. The combination, with a gear having tooth faces radiating from its axis, whose rotation sweeps the outer ends only of its teeth farthest removed from the gear axis through a liquid lubricant supply, of a stationary member cooperating with said gear to obtain the elevation of lubricant to the other, inner portions of said teeth nearer the gear axis, said member being partially submerged in said lubricant supply.

5. The combination, with a bevel gear, whose rotation sweeps the outer ends only of its teeth through a liquid lubricant supply, of a stationary member cooperating with said gear to obtain the elevation of lubricant to the other, inner portions of said teeth, said member presenting to the lubricant set in motion by said gear, a surface that makes an acute angle with the face of said gear.

6. The combination, with a bevel gear, whose rotation sweeps the outer ends only of its teeth through a liquid lubricant supply, of a stationary member cooperating with said gear to obtain the elevation of lubricant to the other, inner portions of said teeth, said member cooperating with the face of said gear to provide an inclined wedge shaped trough, for the conveyance of lubricants set in motion by said gear.

7. The combination, with a bevel gear, whose rotation sweeps the outer ends only of its teeth through a liquid lubricant supply, of a stationary member cooperating with said gear to obtain the elevation of lubricant to the other, inner portions of said teeth, said member cooperating with the face of said gear to provide a wedge shaped trough, inclined in the direction of movement of the gear teeth through said lubricant.

8. The combination, with a rotating element presenting an annular face whose lower portion has limited submergence in liquid lubricant, of a stationary member disposed in plowing relation to the lubricant set in motion by said rotating element, for the upward deflection of said lubricant to the unsubmerged portions of the annular face of said rotating element.

9. In apparatus for the lubrication of vertically disposed gears, the combination of a vertically disposed gear having tooth faces radiating from its axis, a container for a liquid lubricant, the normal level of lubricant therein being such as to only partly submerge the gear teeth, means for rotating the gear and causing a flow of lubricant in the container and an elevated obstruction in the path of flow of the lubricant to intercept and raise the flowing lubricant on the gear teeth and lubricate the latter.

10. The combination with a bevel gear, rotatable on a substantially horizontal axis and having limited submergence at its lower portion in a lubricant supply, so that only the outer portions of its teeth in the zone of submergence are carried below the lubricant level, of a member in said zone of submergence adjacent the gear teeth against which the lubricant set in motion by said teeth accumulates, said member inclining upwardly above the lubricant level, whereby the accumulating lubricant is elevated into contact with the unsubmerged tooth portions.

FRANK P. DAHLSTROM.